Figure 1:
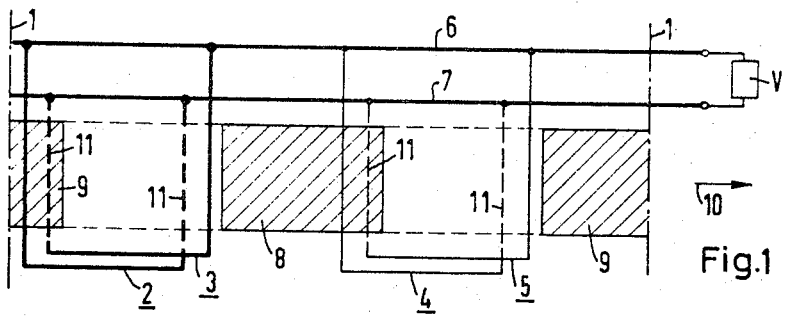

Dec. 3, 1968   W. KAFKA   3,414,743
COMMUTATING ARRANGEMENTS FOR ELECTRIC MACHINES WITH
SUPERCONDUCTING ARMATURE WINDINGS
Filed March 11, 1966

United States Patent Office 3,414,743
Patented Dec. 3, 1968

3,414,743
COMMUTATING ARRANGEMENTS FOR ELECTRIC MACHINES WITH SUPERCONDUCTING ARMATURE WINDINGS
Wilhelm Kafka, Tennenlohe, Germany, assignor to Siemens Aktiengesellschaft, Erlangen, Germany
Filed Mar. 11, 1966, Ser. No. 533,549
Claims priority, application Germany, Apr. 1, 1965, S 96,318
6 Claims. (Cl. 310—10)

My invention relates to superconducting devices. More particularly, it relates to commutating arrangements for DC machines which have superconducting armature coils.

In order to supply utilization devices such as superconducting field coils or to energize transmission lines which comprise superconducting material, generators with superconducting armature coils are required. The use of such generators presents the advantage that pulse locations between the superconductors and the normal conductors are unnecessary. The use of these generators presents the added advantage that considerably higher energies may be converted therein on a smaller area as compared to machines which comprise armature coils having normal conductors.

Commutation in direct current machines with superconducting armature coils is achieved with great difficulty. In this connection, a large accumulation of heat occurs locally between a superconducting collector and a superconducting brush because of transfer resistance, such heat being quite difficult to remove at low temperatures. Furthermore, the amount of pressure may not be sufficiently increased for the transfer resistance to attain an acceptable value. The presence of a high amount of friction limits this increase.

An effective arrangement for achieving proper commutation in direct current machines having superconducting armature coils has been to convert sections of the armature winding as switching paths (high current cryotrons) using an operating magnetic field, relative motion being provided between the paths and the magnetic field, the paths being alternately switched between the superconducting and normally conducting states. Thereby, the commutation is transferred to the coil winding. Although this arrangement has been found to be effective for commutating, there is presented the problem therein of the need to connect the switching paths only in a current-free state. If the current in a switching path is not precisely zero at the moment of transition, then losses occur which are proportional to the square of the current magnitude. Such losses perforce occur at the very low temperature level of the superconductor and have to be removed by suitable cooling means such as cooling machines. As is well known, the required efficiency of heat removal at the extremely low superconducting temperatures is much greater than that required for the removal of waste heat at normal temperatures such as room temperatures.

To reduce the commutating losses as mentioned in connection with the commutating arrangements described hereinabove, commutating poles are employed therein. This is an effective technique for reducing commutating losses but presents the problem which is occasioned by the fact that an exact proportioning of commutating pole excitation is difficult if the excitation of the operating poles is not constant but is displaced in order to vary the output voltage of the machine.

Accordingly, it is an important object of this invention to provide a commutating arrangement for a DC machine having a superconducting armature coil in which commutating losses therein are substantially minimized.

This object is attained by providing saturating inclusions to render variable the inductance of the commutating loop whereby a pause occurs at the zero current point. Such type of inductance for the commutating loops is effected with the use of iron coils whose operating point is located quite deeply in the saturation region at the operating current of the loop. With such arrangement, a quite high inductance is obtained during current decay at the moment of zero current value when the coil switches from one to the other of its states. The current-free state persists until the remagnetizing of the iron coil is completed and saturation is again obtained.

The duration of the current-free pause may be adjusted through the appropriate dimensioning of the cross section of the iron coil and the number of winding turns relative to the operating voltage in the respective turns. The voltage which functions to reduce the current in the commutating loop to zero and to remagnetize the iron coil, i.e., the commutating voltage, may be induced either by a commutating pole specifically provided for such purpose or may be supplied by other winding portions of the machine or by the load. If the machine operates upon a chemical bath wherein a polarization voltage occurs or upon a storage battery of a machine with an opposite voltage, then the load is suited to provide the commutating voltage.

Generally speaking and in accordance with the invention, there is provided a direct current machine which comprises a superconducting armature coil wherein the coil comprises a plurality of loops, each of the loops respectively including a portion which functions as a switching path which is alternately switched between the normally conducting and superconducting states and magnetic means for providing a magnetic field, relative motion between the field and the portions causing the aforesaid switching of the portions. There is further included the improvement which comprises saturating magnetic coil means associated with the loops to render variable the inductance in the loops to thereby produce a finite current-free period in the loop at substantially the zero current point.

The foregoing and more specific objects and features of my invention will be apparent from, and will be mentioned in the following description of a commutating arrangement for direct current machines with superconducting armature coils shown by way of example in the accompanying drawing.

Figure 2:
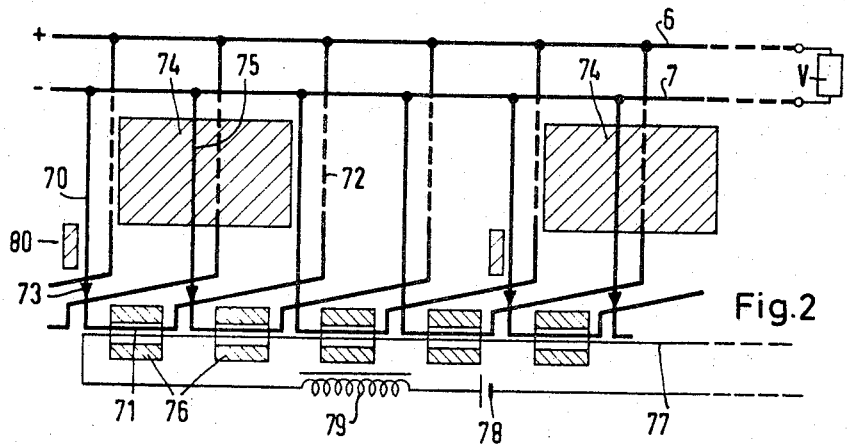
Figure 3:
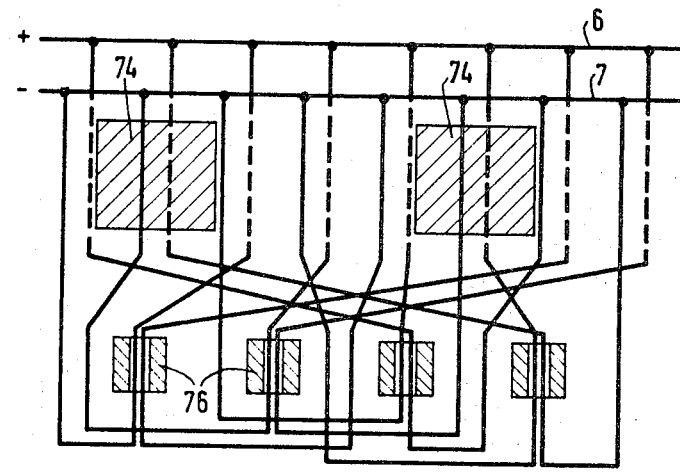

In the drawing, FIG. 1 is a schematic depiction of a commutating arrangement for an electric machine having a superconducting armature winding in which portions of the loops of the winding operate as switching paths;

FIG. 2 is a schematic depiction of an illustrative embodiment of a commutating arrangement for a machine, as shown in FIG. 1, constructed in accordance with the principles of the invention; and FIG. 3 is a schematic depiction, similar to FIG. 2, of another embodiment according to the invention.

Referring now to FIG. 1 there is schematically depicted a commutating arrangement for a DC machine having a superconducting armature coil, the showing therein being of a cylindrical uncoiled armature winding. For convenience in understanding the depiction, it can be considered that the winding has been sectioned along line 1. Loops 2 and 3 and loops 4 and 5 are combined into respective groups. In this connection, it is to be understood that the loops of a group are to be considered as being superjacent and are shown next to each other for reasons of simplicity of depiction and description of operation. With the arrangement shown in FIG. 1, more spaces free of winding ends are provided which improves the accessibility to the machine. Loops and groups of loops are connected electrically in parallel with each other and are connected to bus bars 6 and 7 for current removal. Structures 8 and 9 represent operating magnetic poles of like polarity. These poles should be considered as being located below the armature coil and moving relative to the latter in the direction of the arrows 10. The armature may be arranged to be stationary and contained in a cryostat. With stationary operating poles, such arrangement presents the advantage, as compared to a movable armature coil, that no contact problems occur in connection with the current utilization devices. Each coil or loop of the armature winding has a switching path 11, depicted in FIG. 1 by broken lines. These switching paths, i.e., gate conductors of high current cryotrons, comprise a superconducting material whose critical field strength is smaller than the magnetic field strength of the operating poles. However, their critical field strength should be of such magnitude that no transition can occur because of armature currents even in situations of maximum load. During the passage of the operating poles, the sections of the armature coil which function as switching paths are alternately switched back and forth between the superconducting and normally conducting states.

Switching paths 11 may be comprised of superconducting materials such as, for example, lead or niobium or alloys such as lead-bismuth, niobium-tantalum, or molybdenum-rhenium. The superconducting materials comprising the switching paths are preferably provided as thin layers in these switching paths, suitably in a thickness not exceeding $10^{-5}$ centimeters in order to provide a relatively large resistance by means of through path length when the superconducting materials comprising the paths are in the normally conducting state. The remaining sides of the loops consist of such hard superconductors that remain in the superconducting state even when subjected to the action of the operating pole field. These remaining sides may be in the form of wires or tapes and may be comprised of alloys such as niobium-zirconium or titanium-niobium. They may also be of intermetallic compounds such as, for example, niobium-tin ($Nb_3Sn$) or vanadium-gallium ($V_3Ga$). The critical current densities of the hard superconductors are, for example, in niobium-zirconium $10^5 A/cm^2$ at a field strength of 20 kilograms. The magnitude of the current density in the armature has to be below this value.

In the coil groups comprising coils 2 and 3, and coils 4 and 5 respectively, the switching paths are respectively located at alternate coil sides and the sides of the coils are also connected in mutually alternate relationship to the bus bars 6 and 7. A coil group, so arranged, produces two voltage pulses right next to each other. The coil side disposed parallel to the direction of movement of the operating poles does not exceed in length the length of the dimension of an operating pole which is parallel to the direction of movement. The coil groups are uniformly distributed about the periphery of the armature coil and are spaced from each other a distance of one coil width. As many operating poles are provided as are necessary such that one longitudinal side (a side transverse to the direction of movement) always lies in the operating magnetic field. As shown in the depiction in FIG. 1, the armature coils extend across half a pole pitch. Preferably, the length of the coil is at least equal to the length of the operating poles (transverse to the direction of movement). If the coils were chosen to be wider than the width of the operating poles, then a short circuit would repeatedly occur in the load connection. If the coils were chosen to have a width less than that of the operating poles, then the widths of the operating poles would not be fully utilized and availed of. The double voltage pulses of the individual coil groups occur sequentially and right next to each other.

If, for example, as shown in FIG. 1, the operating poles move past the coil groups from left to right, then a voltage is induced in the left sides of the coils 2 and 4 which drives a load current through a utilization device V. At the same time, the switching paths 11 on the left side undergo a transition from the superconducting to the normally conducting state under the action of the operating magnetic field. This renders them so highly resistant that the voltages induced therein do not supply any appreciable amount of current. In the arrangement illustrated in FIG. 1, this current would constitute a dissipated current which would flow in a direction opposite to that of the operating current. When, during their passage, the operating poles reach the right longitudinal sides of the coil groups, an operating voltage of the original polarity is induced between the bus bars in coils 3 and 5 according to the illustrated alternate type of connection. The left sides 11 of the coils are thereby again in the superconducting state while the right sides 11 of the coils which are functioning as switching paths produce only a relatively small amount of current because of their high resistance due to their transition from the superconducting to the normally conducting state. Effectively, the operating current in the second half wave of current is commutated in each coil.

In FIG. 2 wherein there is shown a schematic depiction illustrating the principle of the invention, the arrangement shown therein is an example of a generator winding in which the commutating voltage is impressed upon the commutating coil by a coil which is shifted by one quarter of a pole pitch. At the chosen moment, a voltage is not induced in the coil which is comprised of parts 70, 71 and 72. However, the complete load current is still present and is indicated by the arrow 73. The current must become zero in time, i.e., before the precise moment that pole 74 reaches the coil conductor 72 to insure that no commutating losses occur in switching path 72. The necessary voltage is supplied by the coil conductor 75 which is located directly under pole 74. In order that the current-free condition be maintained for a finite period in coil 70, 71, 72, coil portion 71 is interlinked with an iron coil 76 whose operating point lies deep in the saturation region, during the existence of operational current in the coil.

The illustrative embodiment shown in FIG. 2 relates to a two-pole machine with 8 coils, FIG. 2 being only a partial illustration of such machine. Each coil is provided with its own iron coil 76. If the iron coils have a wide hysteresis loop characteristic, then the magnetic reversal does not occur at zero current but instead at a current value which deviates from zero. Through premagnetization of the iron coil, the transition may be shifted to a current-free condition. Such pre-magnetization, carried out at the same time for all of the coils is illustrated in FIG. 2. It is achieved with the employment of a conductor 77 which extends through all of iron coils 76 and is supplied by a variable current source 78. In order to prevent the voltages induced in the premagnetizing conductor from changing the pre-magnetizing current, a smoothing reactor 79 is included in series connection. Iron coils 76 are designed in this embodiment as cylindrical coils and are linked with the coils by virtue of the fact that parts of the latter extend therethrough. In this type of interlinking arrangement, it is unnecessary to bring the coils to the superconducting temperatures. The straight superconducting parts may be enveloped in heat insulation and, as so enveloped, inserted into the coils. Particularly suitable as coils are tape or cut tape coils of oriented silicon or nickel iron.

The period necessary for the magnetic reversal of iron coils 76 and thereby the duration of the current-free pause period depends upon the cross section of the coils, the number of turns, the saturation inductance, and the voltage appearing in the respective coil. The larger the latter voltage in the coil is, the shorter is the period required for the magnetic reversal. By providing auxiliary poles 80 which have the same magnetic polarity as the operating poles, a rectified voltage may again be produced in the coils after the passage of the main poles, and thereby reduce the magnitude of the voltage required for the magnetic reversal of the iron coils. With such arrangement and technique, there is enabled the attaining of a current-free pause, using an iron coil of smaller cross section, which is as long in duration as the one produced using an iron coil having a larger cross section but without the employment of auxiliary poles. In the arrangement shown in FIG. 2, at the moment at which the current in loop 70, 71, 72 is substantially zero, the auxiliary pole produces a field of such strength and, correspondingly, a voltage of such magnitude in conductor 70 that the voltage in conductor 75 is virtually balanced out. As soon as the auxiliary pole 80 passes from conductor 70, the switching path 72 must be fully able to block. Then, only the easy direction flowing barrier current of opposing direction flows in the coil, the magnitude of such current being determined by the terminal voltage and the barrier resistance of switching path 72. In order to prevent the auxiliary poles from causing blocking in the switching paths, the operating and the auxiliary poles are alternately arranged and the switching paths are made only as wide as the operating poles.

The voltage time integral to be absorbed by the iron coils is at first greater during the idling of the machine than during the time of a full load. These time integrals may be balanced by exciting the auxiliary pole in dependence upon the load such that it is either less or oppositely excited than during idling. Such effect may be provided by a differential excitation. For example, the auxiliary pole is provided with an excitation winding which is traversed by the load current and with an excitation winding which is connected to the terminals of the machine and in which current flow is in the opposite direction.

The simultaneously commutating coils may be linked with a common iron coil to enable a reduction in the number of coils. Then, for a winding with four coils per pole pitch, only four iron coils are necessary, even in the case of a multipole arrangement. FIG. 3 shows such arrangement for two poles.

It will be obvious to those skilled in the art upon studying this disclosure that commutating arrangements for electric machines having superconducting armature windings permit of a great variety of modifications and hence can be given embodiments other than those particularly illustrated and described herein without departing from the essential features of my invention and within the scope of the claims annexed hereto.

I claim:
1. In a direct current machine comprising a superconducting armature coil, said coil comprising a plurality of loops, each of said loops respectively including a portion which functions as a switching path which is alternately switched between the normally conducting and the superconducting states and magnetic means for providing a magnetic field, relative motion between said field and said portions causing said switching of said portions; the improvement which comprises saturating magnetic coil means associated with said loops to render variable the inductance in said loops to thereby produce a finite current-free period in said loop at substantially the zero current point.

2. In a direct current machine as defined in claim 1 in which said magnetic coil means comprises a coil for each of said loops respectively, each of said coils being chosen to have an operating point relative to the current in a coil which is substantially deep inside the saturation range.

3. In a direct current machine as defined in claim 2 in which said magnetic means comprises a plurality of spaced operating magnetic poles and further including auxiliary magnetic poles having the same polarity as said operating magnetic poles and disposed in alternate relationship with said operating magnetic poles.

4. In a direct current machine as defined in claim 1 wherein said magnetic coil means is premagnetized.

5. In a direct current machine as defined in claim 1 wherein said magnetic coil means is coil-oriented silicon iron.

6. In a direct current machine as defined in claim 1 wherein said magnetic coil means is coil-oriented nickel iron.

References Cited

UNITED STATES PATENTS 3,292,021  12/1966  Hoag _____ 310—40

OTHER REFERENCES

Electrical Review, Jan. 3, 1964, page 22.

J. D. MILLER, *Primary Examiner.*

D. X. SLINEY, *Assistant Examiner.*